Aug. 9, 1938.   E. C. HORTON   2,126,638
SIGNALING SYSTEM FOR MOTOR VEHICLES
Filed Jan. 22, 1936
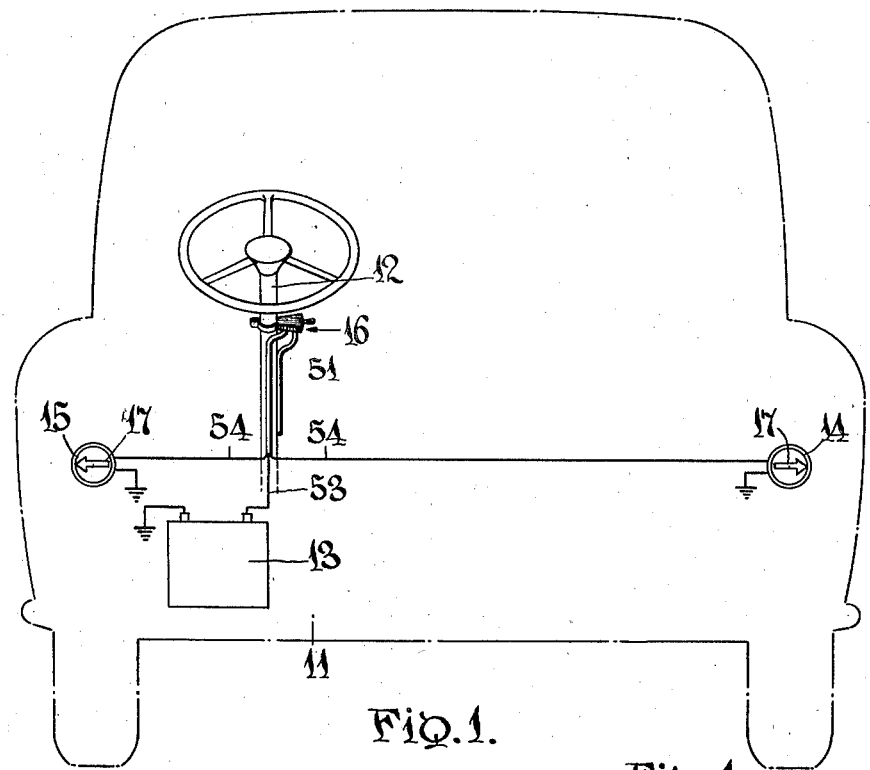
Fig.1.
Fig.4.
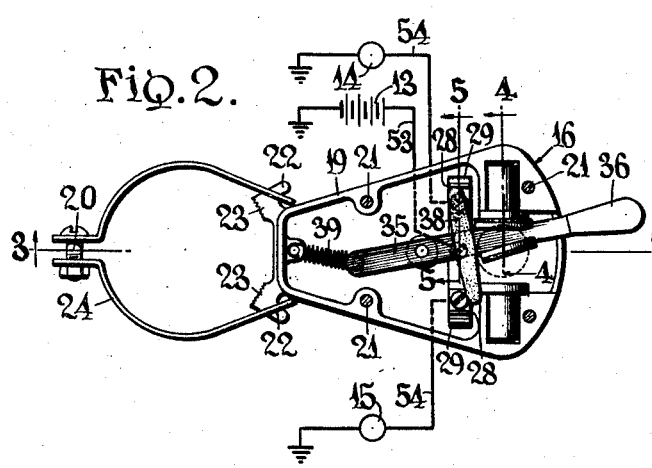
Fig.2.
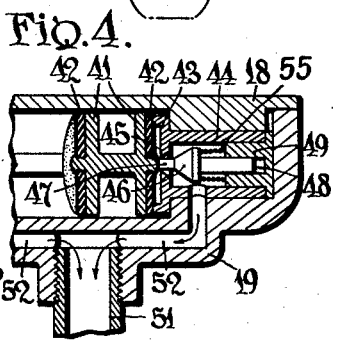
Fig.5.
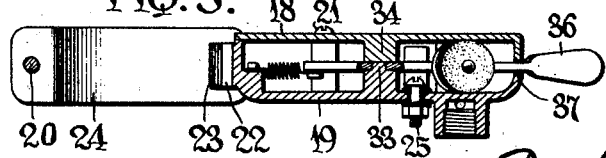
Fig.3.
INVENTOR
Erwin C. Horton,
BY
Beau, Brooks, Buckley & Bean
ATTORNEYS Patented Aug. 9, 1938

2,126,638

UNITED STATES PATENT OFFICE 2,126,638

SIGNALING SYSTEM FOR MOTOR VEHICLES

Erwin C. Horton, Hamburg, N. Y., assignor to Trico Products Corporation, Buffalo, N. Y.

Application January 22, 1936, Serial No. 60,328

12 Claims. (Cl. 177—339)

This invention relates to a signaling system for motor vehicles, wherein dual indication signal means are provided which are manually set and are self-clearing, and also to an improved control unit which is adapted for such systems and other systems.

According to my invention a control member, which is normally in a neutral position, is movable manually to one of two positions for effecting distinctive display of dual indication signal means. The control member is retained in either operative position by stick means controlled by suction induced in the intake manifold of the vehicle engine, such stick means being adapted to release upon decrease of the degree of suction, such as will usually occur when the engine throttle is opened. My signal system is an improvement on the vehicle signal invention of John R. Oishei, set forth in his application Serial No. 5,106, filed February 5, 1935.

These and other objects and advantages, including those inherent in the structure and arrangement of the parts of the control unit, will become apparent from the following description of the typical embodiment of the invention shown in the accompanying drawing, wherein:

Fig. 1 is a view showing the application of the apparatus to a motor vehicle;

Fig. 2 is a plan view of the control portion of the apparatus with a cover portion of a casing member removed;

Fig. 3 is a sectional view taken along line 3—3 of Fig. 2;

Fig. 4 is a fragmentary section taken partially along line 4—4 of Fig. 2; and

Fig. 5 is a section taken along line 5—5 of Fig. 2.

As shown in Fig. 1, the motor vehicle 11, having steering column 12 and a battery or other source of electrical energy 13, is provided with right and left turn indicators 14 and 15, respectively, controlled by means of a control unit 16 which may be conveniently mounted upon the steering column 12. Each turn indicator may comprise a face having an indicating portion such as arrow 17, which is rendered apparent by electrical means, such as a light bulb (not shown) disposed behind the face of the indicator.

The control unit 16, by which the operator of the vehicle may cause one or the other indicators to become effective, includes a casing member having upper and lower sections 18 and 19 secured together by fasteners 21. The lower section is provided at one end with a pair of hooked projections 22 having faces 23, 23 adapted for seating upon the steering column. A two part strap 24, adjustable by screw means 20, has openings at its ends for receiving the hooks 22, 22 to retain the unit upon the steering column.

Contact member 26 is secured to the casing section 19 by fastener 25 and insulated from the casing by insulator 27. Flexible contact fingers 28, adapted to be flexed into contact with the end portions 29, 29 of member 26, are secured to the casing by fasteners 31, 31 and are insulated from the casing and member 26 by insulators 32, 32.

Mounted for pivotal movement on trunnion 33 of the casing section 19 and retained in place by trunnion 34 on casing section 18 is a lever 35 having a handle portion 36 extending from the casing through slot 37. Carried by the lever is a cross-bar 38 which is adapted to move one contact finger 28 into contact with one portion 29 of member 26 when the lever is moved about its pivot axis in one direction, and adapted to move the other contact finger 28 into contact with the other part 29 when the lever is moved in the opposite direction. A tension spring 39 secured to the end of the lever opposite handle 36 normally retains the handle in a neutral position where the cross-bar does not hold either contact 28, 29 closed.

Secured to a flange 41 on each side of lever 35 is a closure disc 42, preferably formed of leather or similar packing material, for closing over the mouth of a shallow cup 43 formed on a tubular part 44, one such part 44 being disposed on each side of the lever. A valve opening 45 in the base of each cup is adapted to be closed by a valve 46 which has a stem portion 47 extending through the valve opening and another stem portion 48 slidingly fitted to a valve stem guide 49. A suction conduit 51, connected to the intake manifold of the vehicle's internal combustion engine (not shown) connects into passages 52, 52 in casing section 19, one passage leading into the interior of each tubular member 44.

The electrical connections, as shown in Fig. 2, may consist of a lead 53 from one terminal of battery 13 to fastener 25, the other terminal of the battery being grounded, and a lead 54 from each fastener 31 to one of the indicators, 14 or 15. In the preferred arrangement shown, the forward fastener 31 is connected by one lead 54 to indicator 14 and the rearward fastener 31 to the other indicator 15 by the other lead 54.

With the vehicle approaching a turn in the vehicle's route, the driver will either allow the throttle to partially close or remain in the same position since the vehicle's speed is to be reduced, or in any event, not increased. Hence, at such time a comparatively high degree of suction will maintain in the engine intake manifold and in conduit 51, passage 52, 52 and the interiors of tubular parts 44, 44, the valves 46, 46 being held seated by springs 55, 55. The operator, desiring to warn following traffic of the contemplated turn, will move the handle 36 of the lever 35 forwardly if the turn is to be to the left. Thereupon the forward contact parts 28, 29 will be closed or contacted as shown in Figs. 2 and 5, establishing the electrical circuit through left turn indicator 15. Simultaneously the forward closure disc 42 will close over the adjacent cup 43, as shown in Fig. 4, and the valve stem 47 will be engaged and moved to unseat forward valve 46 so that suction will be applied to the face of disc 42 holding the lever in left turn position against the tension of spring 39, even though the operator release the handle 36. As a result of the operation of this suction stick arrangement, the left turn indicator 15 will remain energized until the left turn is negotiated, when the operator may open the engine throttle and thereby temporarily decrease the suction in the manifold and connected cup 43, whereupon the springs 39 and 55 will return lever 35 to neutral position allowing contacts 28, 29 to break and opening the circuit through indicator 15. Since opening of the throttle is usual after a turn has been made, this release of the suction stick mechanism is virtually automatic and requires no conscious effort of the operator.

If a right turn is to be made the operation is the same except that the handle 36 is moved rearwardly, thereby closing the circuit through the rear contacts 28, 29 and the right turn indicator 14, and simultaneously bringing into play the rearward stick means 42, 43.

It will thus be seen that the operator may signal a contemplated right or left turn by merely moving the handle 36 either rearwardly or forwardly at a time when the throttle is not widely open and then releasing the handle; and that the energized signal will remain effective by reason of the suction operated stick means until the operator next opens the throttle. However, should the engine be stopped before the throttle is opened, the consequent dissipation of manifold suction will automatically effect release of the stick means and opening of the signal circuit, and, of course, the signal may be manually released by the operator at any time by movement of handle 36 to the neutral position.

What is claimed is:

1. In dual signal indication apparatus for a motor vehicle having an engine with a fluid intake and a suction line connected to said intake, dual indication signal means including switch means in electrical circuit therewith for effecting display and clearing of each signal indication, a member movable from a neutral position to one operating position for causing the switch means to effect one signal indication and to a second operating position for causing the switch means to effect the other signal indication, and means connected to said suction line and operative to retain said member in either operating position when the suction exceeds a predetermined degree.

2. In a dual signal indication apparatus for a motor vehicle having an engine with a fluid intake and a suction line connected to said intake, dual indication signal means and operating means therefor including an operating member movable from a neutral position to one operating position to effect display of one signal indication and movable to another operating position to effect display of the other signal indication, and means connected to said suction line and operative to retain said member in either operating position when the suction exceeds a predetermined degree, said last mentioned means comprising a pair of cups communicating with the suction line and a pair of cup closures carried by said member, one of said closures closing over one of said cups for retention thereon by suction when said member is moved to either operating position.

3. In a control unit, a pair of fixed electrical contacts and a pair of movable contacts, a member movable from a neutral position to one operated position wherein it will close one of said movable contacts against the adjacent fixed contact and movable to a second operated position wherein it will close the other movable contact against the other fixed contact, spring means for urging said member to neutral position, a pair of cups connected to a source of suction, a pair of closures carried by said member, one of said closures being adapted to close against one of said cups when said member is moved to either operated position for retaining the member in operated position when said source of suction is effective, a valve for closing each cup from the source of suction, and means for opening one valve when the member is brought into either operated position.

4. In a control unit, a pair of fixed electrical contacts and a pair of movable contacts, a member movable from a neutral position to one operated position wherein it will close one of said movable contacts against the adjacent fixed contact and movable to a second operated position wherein it will close the other movable contact against the other fixed contact, means for urging said member to neutral position, a pair of first elements carried by said member, a pair of second elements having openings therethrough connectible to a source of suction, one of said first elements being closed against one of said second elements when said member is moved to either operated position, such first element when closed against the second element effecting a suction chamber therebetween for holding said elements together while the suction is effective.

5. In a control unit, an operating member movable from a first position to a second position, an element carried by said member, a second element against which the first element abuts when the member is moved to said second position, the surface of one of said elements being recessed to define a suction chamber when the elements are in abutment, said second element having a passage leading from the face thereof and connectible to a source of suction, a valve normally closing said passage, and means for opening said valve when said elements are brought into abutment.

6. In a control unit, an operating member movable from a first position to a second position, an element carried by said member, a second element spaced from the first element when the member is in said first position and against which the second element abuts when the member is moved to the second position, the surface of one of said elements being recessed to define a suction chamber between the elements when they are in abutment, said second element having a passage leading from the face thereof and connectible to a source of suction, a valve seat in said passage and a valve movable toward the face of the second element to close against said valve seat, resilient means for normally holding said valve seated, and cooperating parts associated with the valve and the first element for unseating the valve when said elements are brought into abutment.

7. In a control unit, a control member movable from a first position to either one of two other positions, spring means for urging said member to the first position, a pair of cups connected to a source of suction, a pair of closures carried by said member, one of said closures being adapted to close against one of said cups when said member is moved to either of said other positions for retaining the member in said other position when said source of suction is effective, a valve for closing each cup from the source of suction, and means for opening one valve when the member is brought into either of said other positions.

8. In a control unit, a control member movable from a first position to either one of two other positions, means for urging said member to said first position, a pair of first elements carried by said member, a pair of second elements having openings therethrough connectible to a source of variable suction, one of the first elements being closed against one of said second elements when said member is moved to either of said other positions, such first element when closed against the second element forming a chamber therebetween in which suction of sufficient degree may be effective for holding said elements together.

9. In a control unit for dual indication signals cooperating with the fluid intake of a vehicle engine, a member movable from a first position to either one of plural other positions, means for urging return of the member from any of said other positions to said first position, means connecting the unit with the fluid intake, and means effective when the suction therein is above a predetermined degree for holding said member against return by the first mentioned means.

10. In a control unit, a member movable from a first position to either one of plural other positions, means for urging return of the member from any one of said other positions to said first position, means connecting the unit with a variable source of suction, and means associated with the unit and effective when the suction is above a predetermined degree for holding said member against return by the first mentioned means.

11. In dual signal indication apparatus for a motor vehicle having an engine with a fluid intake, a two-indication signal means including switch means in electrical circuit therewith for effecting display and clearing of each signal indication, a member movable for operating the switch means, said member being movable from rest position to either of two operating positions to effect display of either one or the other of the two signal indications, means effective to hold the switch means in an operating position when the suction of the fluid intake is above a predetermined degree, and means for returning said member to rest position when said suction is lesser.

12. In dual signal indication apparatus for a motor vehicle having an engine with a fluid intake, a pair of signals normally in non-indicating condition, control means for said signals including a member movable from rest to one or the other of two operating positions for effecting an indicating condition of one or the other signal of said pair of signals, and said control means including means responsive to suction at said fluid intake for retaining a signal in indicating condition when the suction is above a predetermined degree and otherwise allowing the signal to return to non-indicating condition.

ERWIN C. HORTON.